United States Patent
Narula et al.

(10) Patent No.: US 8,449,790 B2
(45) Date of Patent: May 28, 2013

(54) SOLID LITHIUM ION CONDUCTING ELECTROLYTES AND METHODS OF PREPARATION

(75) Inventors: Chaitanya K. Narula, Knoxville, TN (US); Claus Daniel, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 332 days.

(21) Appl. No.: 12/824,350

(22) Filed: Jun. 28, 2010

(65) Prior Publication Data

US 2012/0171562 A1    Jul. 5, 2012

(51) Int. Cl.
*H01M 4/88* (2006.01)
(52) U.S. Cl.
USPC ........ 252/182.1; 429/189; 429/322; 526/161; 526/196
(58) Field of Classification Search
USPC ....... 252/182.1, 183.11, 500, 521.1; 429/189, 429/322; 257/295; 526/161, 196; 977/773
See application file for complete search history.

(56) References Cited

U.S. PATENT DOCUMENTS

2006/0001064 A1* 1/2006 Hill et al. .................. 257/295
2008/0268346 A1 10/2008 Inda

OTHER PUBLICATIONS

Murugan R. et al., "Structure and Lithium Ion Conductivity of Garnet-Like $Li_5La_3Sb_2O_{12}$ and $Li_6SrLa_2Sb_2O_{12}$", *Materials Research Bulletin* 43:2579-2591 (2008).
Murugan R. et al., "Effect of Lithium Ion Content on the Lithium Ion Conductivity of the Garnet-Like Structure $Li_{5+x}BaLa_2Ta_2O_{11.5+0.5x}(\chi=0-2)$", *Applied Physics A—Materials Science & Processing* 91:615-620 (2008).
Thangadurai V. et al., "Crystal Structure Revision and Identification of $Li^+$-Ion Migration Pathways in the Garnet-Like $Li_5La_3M_2O_{12}$ (M=Nb, Ta) Oxides", *Chem. Mater.* 16(16):2998-3006 (2004).

* cited by examiner

*Primary Examiner* — Khanh Tuan Nguyen
(74) *Attorney, Agent, or Firm* — Scully, Scott, Murphy & Presser, P.C.

(57) ABSTRACT

A composition comprised of nanoparticles of lithium ion conducting solid oxide material, wherein the solid oxide material is comprised of lithium ions, and at least one type of metal ion selected from pentavalent metal ions and trivalent lanthanide metal ions. Solution methods useful for synthesizing these solid oxide materials, as well as precursor solutions and components thereof, are also described. The solid oxide materials are incorporated as electrolytes into lithium ion batteries.

4 Claims, 1 Drawing Sheet

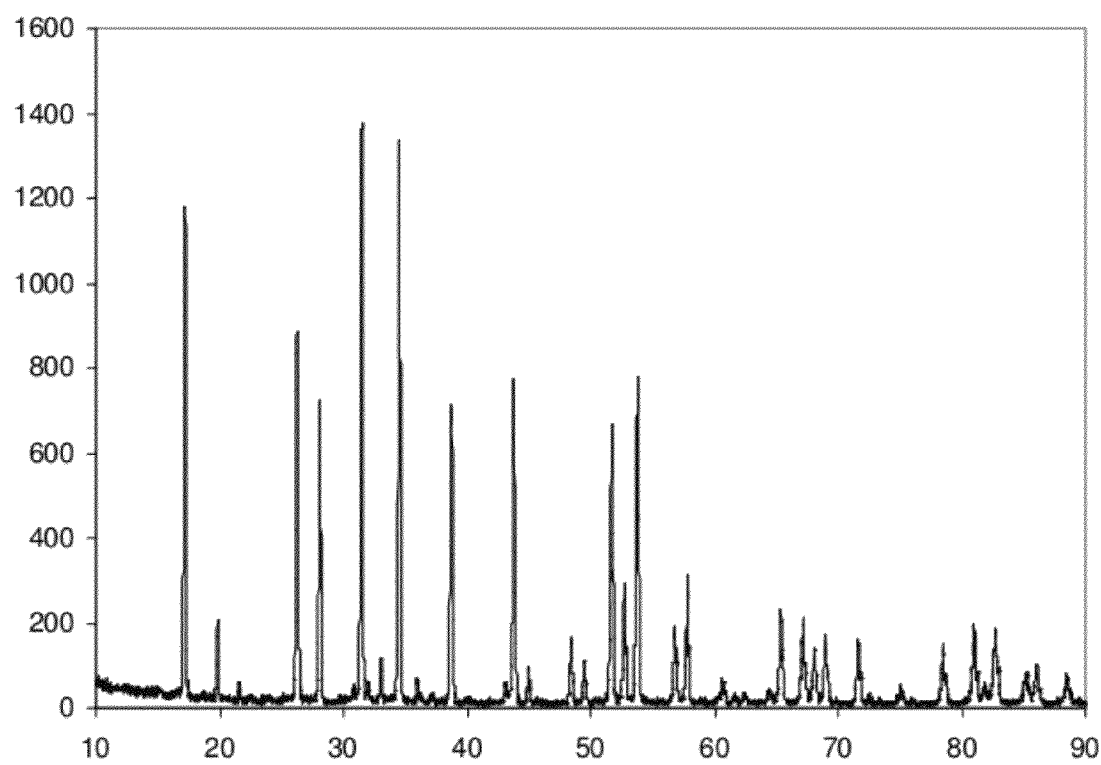

SOLID LITHIUM ION CONDUCTING ELECTROLYTES AND METHODS OF PREPARATION

This invention was made with government support under Contract Number DE-AC05-00OR22725 between the United States Department of Energy and UT-Battelle, LLC. The U.S. government has certain rights in this invention.

FIELD OF THE INVENTION

The present invention relates to the field of lithium ion conducting electrolytes, and particularly, to such electrolytes that are solid, and more particularly, solid oxide electrolytes.

BACKGROUND OF THE INVENTION

As liquid organic and polymer electrolytes continue to pose a major safety concern and shortened lifetime for current lithium ion batteries, solid lithium ion conducting electrolytes are sought for replacing liquid organic and polymer electrolytes. However, there are many difficulties being encountered in efforts to make solid electrolytes that possess the set of optimal characteristics needed to at least maintain such properties as the power output, charge/discharge efficiencies, capacity rating, and lifetime of current liquid and polymer electrolyte lithium batteries. In particular, it is highly desired for the solid electrolyte to exhibit high lithium ion conductivity, along with a negligible electronic conductivity, high electrochemical stability, and long-term stability against reactions with electrode materials.

Although some materials with such properties have been produced, their integration into lithium ion batteries as electrolytes has been significantly limited by the solid-state methods of synthesis currently used in preparing these materials. The solid state methods of synthesis possess numerous drawbacks, including the inability to adjust or optimize the particle size of the solid materials, or to render the solid material as a film, and particularly, thin films (e.g., up to or less than 1 micron) of uniform thickness. Another significant drawback of current solid-state methods of synthesis is their prohibitive cost and resistance to production scale up. A further significant drawback of current solid-state methods is their inability to be integrated into existing lithium ion battery assembly line manufacturing processes.

SUMMARY OF THE INVENTION

In a first aspect, the invention is directed to a heterometallic alkoxide composition useful for the solution synthesis of a lithium ion conducting solid oxide material, herein also referred to as an "oxide material" or "solid oxide". In a particular embodiment, the heterometallic alkoxide includes at least one pentavalent metal, at least one metal selected from trivalent lanthanide metals and alkaline earth metals, and negatively charged ligands, at least one of which is an alkoxide ligand.

In a second aspect, the invention is directed to a precursor solution for producing a lithium ion conducting solid oxide material. The precursor solution contains components that, upon contact with water or acetone, will produce an initial material (i.e., via hydrolysis) that can be converted to the final solid oxide material. In particular embodiments, the precursor solution includes a non-aqueous solvent having dissolved therein lithium ions, and at least one type of metal ion selected from pentavalent metal ions and trivalent lanthanide metal ions, and negatively charged ligands, at least a portion of which are alkoxide ligands. In further embodiments, the precursor solution includes a non-aqueous solvent having dissolved therein lithium ions, at least one type of pentavalent metal ion, at least one type of metal ion selected from trivalent lanthanide metal ions and alkaline earth metal ions, and negatively charged ligands, at least a portion of which are alkoxide ligands. In the precursor solution, it is particularly advantageous in some embodiments that an excess molar amount of lithium is present in the precursor solution relative to the stoichiometric ratio of lithium in the solid oxide material to be produced.

In a third aspect, the invention is directed to a composition that contains lithium-containing solid oxide nanoparticles. Preferably, the nanoparticles have a composition that makes them useful as a lithium ion conducting solid electrolyte material. In particular embodiments, the nanoparticles include an oxide material containing therein lithium ions, and at least one type of metal ion selected from pentavalent metal ions and trivalent lanthanide metal ions. In further embodiments, the nanoparticles include an oxide material containing therein lithium ions, pentavalent metal ions, and at least one type of metal ion selected from trivalent lanthanide metal ions and alkaline earth metal ions.

In a fourth aspect, the invention is directed to a lithium ion battery containing any of the above-described solid oxide compositions as an electrolyte. In particular embodiments, the solid oxide electrolyte material is in the form of a film, e.g., sandwiched between an anode and cathode of the battery, and in particular embodiments, in direct contact with the anode and cathode of the battery.

In a fifth aspect, the invention is directed to a method of preparing a lithium ion conducting solid electrolyte material, such as the solid oxide materials described above. In particular embodiments, the method is useful for preparing a lithium ion conducting solid oxide electrolyte material containing lithium ions and at least one type of metal ion selected from pentavalent metal ions and trivalent lanthanide metal ions. The method includes subjecting a precursor solution to hydrolysis conditions to produce an initial solid or gel, followed by pyrolysis of said initial solid or gel, wherein the precursor solution includes a non-aqueous solvent having dissolved therein the metal species desired to be included in the solid oxide material, i.e., lithium ions, and at least one type of metal ion selected from pentavalent metal ions and trivalent lanthanide metal ions, as well as negatively charged ligands, at least a portion of which are alkoxide ligands. In further embodiments of the above-described method, the lithium ion conducting solid oxide electrolyte material includes lithium ions, at least one type of pentavalent metal ion, and at least one type of metal ion selected from trivalent lanthanide metal ions and alkaline earth metal ions, and the precursor solution includes a non-aqueous solvent having dissolved therein the metal species desired to be included in the solid oxide material, i.e., lithium ions, at least one type of pentavalent metal ion, at least one type of metal ion selected from trivalent lanthanide metal ions and alkaline earth metal ions, as well as negatively charged ligands, at least a portion of which are alkoxide ligands. In particular embodiments of the above-described methods, an excess molar amount of lithium is present in the precursor solution relative to the stoichiometric ratio of lithium in the lithium ion conducting solid electrolyte material to be produced.

The preparative methods described herein for synthesizing these solid oxide materials overcome numerous obstacles of conventional solid-state preparative methods. Some advantages of the solution methods described herein include their simplicity, lowered cost, their amenability in scaling up production and being integrated into existing lithium ion battery assembly line manufacturing. Furthermore, the preparative methods described herein are amenable for producing nanoparticles, films, and coatings of these oxide materials, and particularly, thin films and coatings (e.g., up to or less than 1 micron), as well as uniform films and coatings of these oxide materials.

BRIEF DESCRIPTION OF THE DRAWINGS

FIG. 1. XRD pattern of $Li_5La_3Nb_2O_{12}$ pure solid oxide product prepared from a mixture of Li(OR), La(OR)$_3$, and Nb(OR)$_5$ in a 10:3:2 molar ratio in THF (excess of lithium used).

DETAILED DESCRIPTION OF THE INVENTION

In one aspect, the invention is directed to a solid oxide composition useful as a lithium-conducting electrolyte material. The chemical composition of the solid oxide composition considered herein can be any of the known chemical compositions of lithium-containing solid oxide materials.

In a first set of embodiments, the solid oxide material considered herein is, or includes, an oxide composition that includes lithium ions and at least one type of pentavalent metal ion. The pentavalent metal ion can be any element having a charge of +5, such as, for example, pentavalent niobium ($Nb^{+5}$), tantalum ($Ta^{+5}$), or antimony ($Sb^{+5}$). In some embodiments, only one type of pentavalent metal ion is included (such as any one of the foregoing types), while in other embodiments, two, three, or more different pentavalent metal ions are included. Some examples of such oxide materials include those of the generic formula $LiMO_3$, wherein M represents one or more pentavalent metal ions. When M represents more than one pentavalent metal ion, the oxide materials can further be represented by the formula $LiM^1{}_xM^2{}_yM^3{}_zO_3$, wherein each of $M^1$, $M^2$, and $M^3$ are different pentavalent metal ions, and x, y, and z sum to 1. In particular embodiments, x, y, and z are independently precisely, at least, or no more than 0, 0.05, 0.1, 0.2, 0.3, 0.4, 0.5, 0.6, 0.7, 0.8, 0.9, 0.095, or ranges therein, as long as x, y, and z sum to 1. Some particular examples of such oxide materials include $LiNbO_3$, $LiTaO_3$, $LiSbO_3$, $LiPO_3$, $LiAsO_3$, $LiNb_{0.5}Ta_{0.5}O_3$, $LiNb_{0.4}Ta_{0.6}O_3$, $LiNb_{0.5}Sb_{0.5}O_3$, $LiNb_{0.4}Sb_{0.6}O_3$, $LiTa_{0.5}Sb_{0.5}O_3$, $LiTa_{0.4}Sb_{0.6}O_3$, $Li_{0.5}Na_{0.5}NbO_3$, $Li_{0.5}K_{0.5}NbO_3$, and $Li_{0.5}Na_{0.5}Nb_{0.5}Ta_{0.5}O_3$.

In a second set of embodiments, the oxide material considered herein is, or includes, an oxide composition that includes lithium ions, and at least one type of trivalent lanthanide metal ion. The lanthanide metal can be any of the elements of the Periodic Table of the Elements having an atomic number of 57 to 71. In different embodiments, the lanthanide metal is selected from one, two, three, or more of the following elements: lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu). In particular embodiments, at least one of the lanthanide metals is La. Some examples of such oxide materials include those of the generic formula $LiLnO_2$ and $Li_2LnO_2$, wherein Ln represents any one or more of the lanthanide elements described above.

In a third set of embodiments, the solid oxide material considered herein is, or includes, an oxide composition that includes lithium ions, at least one pentavalent metal ion, and, in addition, at least one type of trivalent lanthanide metal ion.

Some examples of such oxide materials include those of the formula $LiMO_3$ and subformulas therein doped with one or more lanthanides (e.g., $LiMO_3$:Ln, wherein Ln represents one or more lanthanide metals), as well as those of the formulas $LiLnO_2$ or $Li_2LnO_2$ doped with one or more pentavalent metal ions (e.g., $LiLnO_2$:M or $Li_2LnO_2$:M, wherein M represents one or more pentavalent metal ions).

In further embodiments, the oxide material includes lithium ions, at least one type of pentavalent metal ion and/or at least one type of trivalent lanthanide metal ion, and, in addition, at least one type of alkaline earth metal ion. The alkaline earth metal ion can be any of the elements in Group IIA of the Periodic Table. In different embodiments, the alkaline earth metal is selected from one, two, three, or more of the following elements: beryllium (Be), magnesium (Mg), calcium (Ca), strontium (Sr), barium (Ba), and radium (Ra). In one particular set of embodiments, at least one of the alkaline earth metals is Mg. In another particular set of embodiments, at least one of the alkaline earth metals is Ca. In another particular set of embodiments, at least one of the alkaline earth metals is Sr. In another particular set of embodiments, at least one of the alkaline earth metals is Ba. Some examples of oxide compositions containing lithium ions, pentavalent metal ions, and alkaline earth metal ions include those of the formula $LiMO_3$ and subformulas therein doped with one or more alkaline earth ions (e.g., $LiMO_3$:AX, wherein A represents one or more alkaline earth metals and X represents one or more anions to charge balance with A; in particular embodiments, X is an oxide, sulfide, selenide, or telluride anion). Some examples of oxide compositions containing lithium ions, trivalent lanthanide metal ions, and alkaline earth metal ions include those of the formulas $LiLnO_2$ or $Li_2LnO_2$ doped with one or more alkaline earth metal ions (e.g., $LiLnO_2$:AX or $Li_2LnO_2$:AX, wherein AX has been defined above).

In yet other embodiments, the oxide material includes at least one alkali metal ion other than lithium ion, such as those alkali metals selected from sodium (Na), potassium (K), rubidium (Rb), and cesium (Cs). In yet other embodiments, the oxide material includes at least one transition metal ion (i.e., either in place of or in addition to Nb and/or Ta). The transition metal ion can be a first row, second row, or third row transition metal, and main group elements can be from group IIIA-VA, provided that a garnett structure can be retained. Some examples of such materials include $Li_5Ln_3M_2O_{12}$, where M is a Group VB element (V, Nb, Ta); $Li_6ALa_2MO_{12}$, where A is Ca, Sr, and/or Ba, and M is a Group VB element (V, Nb, Ta); $Li_3Ln_3Te_2O_{12}$ (Ln is one or more of any of the lanthanide elements, particularly Y, Pr, Nd, or one or more elements having atomic numbers of 62-71, i.e., Sm to Lu); $Li_3Ln_3W_2O_{12}$ (Ln is one or more of any of the lanthanide elements, particularly Y, Pr, Nd, or one or more elements selected from Sm to Lu); $Li_{5.5}La_3Nb_{1.75}In_{0.25}O_{12}$; and $Li_{5.5}La_{2.75}K_{0.25}Nb_2O_{12}$.

In particular embodiments, the oxide material is, or includes, a material having one or both of the following formulas:

and

In formulas (1) and (2) above, A represents at least one alkaline earth metal, M represents at least one pentavalent metal, Ln represents at least one trivalent lanthanide metal, and x and y are, independently, generally a number of 0 to 2.

In particular embodiments, x and/or y is independently a number of 0, 0.5, 1, 1.5, or 2, or within a range bounded by any of these values.

Some sub-generic classes of formula (1) considered herein include $Li_5Ln_2AM_2O_{11.5}$, $Li_5La_2AM_2O_{11.5}$, $Li_5Ln_2CaM_2O_{11.5}$, $Li_5Ln_2SrM_2O_{11.5}$, $Li_5Ln_2BaM_2O_{11.5}$, $Li_5Ln_2ANb_2O_{11.5}$, $Li_5Ln_2ATa_2O_{11.5}$, $Li_5Ln_2ASb_2O_{11.5}$, $Li_5Ln_2MgM_2O_{11.5}$ (where M is Nb, Ta, or Sb, and Ln is any lanthanide, or more particularly, La and/or Ce), $Li_5Ln_2CaM_2O_{11.5}$ (where M is Nb, Ta, or Sb, and Ln is any lanthanide, or more particularly, La and/or Ce), $Li_5Ln_2SrM_2O_{11.5}$ (where M is Nb, Ta, or Sb, and Ln is any lanthanide, or more particularly, La and/or Ce), $Li_5Ln_2BaM_2O_{11.5}$ (where M is Nb, Ta, or Sb, and Ln is any lanthanide, or more particularly, La and/or Ce), $Li_6Ln_2AM_2O_{12}$, $Li_6La_2AM_2O_{12}$, $Li_6Ln_2CaM_2O_{12}$, $Li_6Ln_2SrM_2O_{12}$, $Li_6Ln_2BaM_2O_{12}$, $Li_6Ln_2ANb_2O_{12}$, $Li_6Ln_2ATa_2O_{12}$, $Li_6Ln_2ASb_2O_{12}$, $Li_6Ln_2CaM_2O_{12}$ (where M is Nb, Ta, or Sb, and Ln is any lanthanide, or more particularly, La and/or Ce), $Li_6Ln_2SrM_2O_{12}$ (where M is Nb, Ta, or Sb, and Ln is any lanthanide, or more particularly, La and/or Ce), and $Li_6Ln_2BaM_2O_{12}$ (where M is Nb, Ta, or Sb, and Ln is any lanthanide, or more particularly, La and/or Ce).

Some examples of compositions according to formula (2) include $Li_5Ln_2M_2O_{12}$, $Li_5La_2M_2O_{12}$, $Li_5Ln_2Nb_2O_{12}$, $Li_5Ln_2Ta_2O_{12}$, $Li_5Ln_2Sb_2O_{12}$, $Li_5Ln_2M_2O_{12}$ (where M is Nb, Ta, or Sb, and Ln is any lanthanide, or more particularly, La and/or Ce), $Li_6La_2AM_2O_{12}$, $Li_6Ln_2ANb_2O_{12}$, $Li_6Ln_2ATa_2O_{12}$, $Li_6Ln_2ASb_2O_{12}$, $Li_6Ln_2MgM_2O_{12}$ (where M is Nb, Ta, or Sb, and Ln is any lanthanide, or more particularly, La and/or Ce), $Li_6Ln_2CaM_2O_{12}$ (where M is Nb, Ta, or Sb, and Ln is any lanthanide, or more particularly, La and/or Ce), $Li_6Ln_2SrM_2O_{12}$ (where M is Nb, Ta, or Sb, and Ln is any lanthanide, or more particularly, La and/or Ce), and $Li_6Ln_2BaM_2O_{12}$ (where M is Nb, Ta, or Sb, and Ln is any lanthanide, or more particularly, La and/or Ce).

In different embodiments, the recited oxygen value of "11.5" in formula (1) can be either a precise value, or alternatively, within a range of the indicated value: for example, ±0.5 of the indicated value (i.e., 11-12), ±0.4 (i.e., 11.1-11.9), ±0.3 (i.e., 11.2-11.8), ±0.2 (i.e., 11.3-11.7), ±0.1 (i.e., 11.4-11.6), or alternatively, only a positive or negative value from the indicated value (e.g., +0.5 from the indicated value, which corresponds to 11.5-12). Likewise, the recited oxygen value of "12" can be either a precise value, or alternatively, within a range from the indicated value: for example, ±0.5 of the indicated value (i.e., 11.5-12.5), ±0.4 (i.e., 11.6-12.4), ±0.3 (i.e., 11.7-12.3), ±0.2 (i.e., 11.8-12.2), or ±0.1 (i.e., 11.9-12.1). Similarly, the value of the subscript on Li can be either the precise value, as indicated, or alternatively, a value of, for example, ±0.5, ±0.4, ±0.3, ±0.2, ±0.1, ±0.05, +0.5, +0.2, −0.5, or −0.2 from the indicated value.

In a preferred embodiment, the oxide composition of the instant invention, described above, is in the form of nanoparticles (i.e., is nanoparticulate). In some embodiments, the term "nanoparticles", as used herein, indicates individual (i.e., separate) particles having a nanoscale size. In other embodiments, the term "nanoparticles", as used herein, refers to grains of the solid oxide material, as typically found in crystalline, semicrystalline, or polycrystalline materials. The nanoparticles generally have an average diameter of less than 1 micron. In different embodiments, the nanoparticles have an average diameter of or less than 900 nm, 800 nm, 700 nm, 600 nm, 500 nm, 400 nm, 300 nm, 250 nm, 200 nm, 150 nm, 100 nm, 90 nm, 80 nm, 70 nm, 60 nm, 50 nm, 40 nm, 30 nm, 20 nm, 10 nm, 5 nm, or an average diameter within a range bounded by any of the foregoing exemplary values. In some embodiments, a portion of the oxide composition (e.g., at least 40, 50, 60, 70, 80, 90, 95, 98, or 99%) is nanoparticulate in nature, while a portion is larger than nanoparticulate (e.g., greater than 1 micron, and up to, for example, 2, 3, 4, 5, 10, 20, 50, or 100 microns in size). In other embodiments, the entire oxide composition is nanoparticulate in nature (e.g., within one of the ranges set forth above). Moreover, in different embodiments, the nanoparticles are either completely monodisperse, or alternatively, possess some level of polydispersity (e.g., a standard deviation (SD) from the mean of or less than 100 nm, 50 nm, 20 nm, 10 nm, 5 nm, 4 nm, 3, nm, 2 nm, or 1 nm).

In a particular embodiment, the nanoparticulate oxide composition described above is in the form of a powder. In some embodiments, the particles of the powder are the same size as the nanoparticles of the solid oxide material. In other embodiments, the particles of the powder are agglomerated forms of the nanoparticles of the solid oxide material. The agglomerated nanoparticles can, on average, have a size of any of the nanoparticle sizes set forth above, or alternatively, a larger size of, for example, 2, 3, 4, 5, 10, 20, 50, or 100 microns in size.

In another particular embodiment, the nanoparticulate oxide composition described above is in the form of a film. The film can have any suitable thickness, e.g., up to 1 millimeter (1 mm), 500 microns (500 μm), 100 microns (100 μm), 50 microns (50 μm), 20 microns (20 μm), 10 microns (10 μm), 5 microns (5 μm), or 1 micron (1 μm). In particular embodiments, the film is a thin film, i.e., up to or less than 1 micron in thickness. The thin film can have an average thickness of, for example, any of the nanoparticle sizes given above. As would be understood by one skilled in the art, the film thickness is necessarily limited by the size of the solid oxide particles. Furthermore, in preferred embodiments, the thickness of the film is substantially or completely uniform, as would be determined by the uniformity in particle size.

In other embodiments, the nanoparticulate oxide composition described above is in the form of fibers or any of a variety of geometrical shapes. The fibers can be as thin as the thickness of the nanoparticles, and up to any suitable thickness (e.g., 1, 2, 5, 10, 50, or 100 microns). Other geometrical shapes include plates and cubes.

The ion conductivity of the solid oxide material is generally greater than $1\times10^{-8}$ S·cm$^{-1}$. In different embodiments, the solid oxide material exhibits an ion conductivity of or greater than $1\times10^{-8}$ S·cm$^{-1}$, $1\times10^{-7}$ S·cm$^{-1}$, $1\times10^{-6}$ S·cm$^{-1}$, $1\times10^{-5}$ S·cm$^{-1}$, $1\times10^{-4}$ S·cm$^{-1}$, $5\times10^{-4}$ S·cm$^{-1}$, $1\times10^{-3}$ S·cm$^{-1}$, or an ion conductivity within a range bounded by any of the foregoing exemplary values.

In another aspect, the invention is directed to methods for preparing a lithium-conducting oxide material. In the method, a precursor solution susceptible to hydrolysis is first subjected to hydrolysis conditions. The precursor solution contains the elements (e.g., metals and oxide source) necessary to make the solid oxide material. The hydrolysis conditions include, at minimum, contact of the precursor solution with water. Generally, 1-2 vol % of water is more than sufficient to cause complete hydrolysis. Particularly when small amounts of precursor solution are used (e.g., a thin film), miniscule amounts of water, such as the trace quantities found in typical or moistened air, can also be sufficient for substantial or complete hydrolysis. A weak acid (e.g., a carboxylic acid) may also be included in trace amounts to facilitate hydrolysis. Generally, hydrolysis of the precursor solution results in formation of an initial solid or gel. Upon drying of the gel, the gel is generally transformed into a xerogel. In some embodiments, the xerogel, or a solid produced (i.e., precipitated) and separated at the outset, may be useful as a lithium-conducting electrolyte without further processing.

Generally, the dried gel or other solid initially produced by hydrolysis requires a heat treatment to produce a final oxide material having the proper stoichiometric ratio of elements and physical characteristics. These properties can be analyzed by a variety of materials characterization techniques, most prominently x-ray diffraction (XRD) and related techniques to determine if the final product has been achieved in a desired level of purity.

In one embodiment, the heat treatment of the initially hydrolyzed product includes one or more pyrolysis steps. During the pyrolysis step, chemical and physical rearrangements occur, often with emission of residual solvent and byproduct species (e.g., loss of $Li_2O$ or $LiOH$). In some embodiments, the pyrolysis step also causes the solid oxide to change from an amorphous state to a crystalline, semi-crystalline, or polycrystalline state. Typically, the pyrolysis step is conducted at a temperature of at least 200° C. and up to 700° C. for a time of up to 48 hours, wherein, generally, higher temperatures require shorter processing times to achieve the same effect. In different embodiments, the temperature employed in the pyrolysis step is 200° C., 250° C., 300° C., 350° C., 400° C., 450° C., 500° C., 550° C., 600° C., 650° C., or 700° C., or within a temperature range bounded by any two of the foregoing exemplary values. For any of these temperatures, or a range therein, the processing time (i.e., time the solid oxide is processed at a temperature or within a temperature range) can be, for example, precisely, at least, or no more than 15 minutes, 30 minutes, 1 hour, 2 hours, 3 hours, 4 hours, 5 hours, 6 hours, 12 hours, 18 hours, 24 hours, 30 hours, 36 hours, 42 hours, 48 hours, or within a time range bounded by any two of the foregoing exemplary values.

In further embodiments, the pyrolysis step described above can be followed by a higher temperature sintering step to further encourage formation of a pure product. In some embodiments, the sintering step is employed primarily to induce further crystallization, particularly when the product resulting from pyrolysis is found to retain an amorphous portion. Typically, the sintering step is conducted at a temperature greater than 700° C. and up to 1600° C. for a time of up to 48 hours, wherein, generally, higher temperatures require shorter processing times to achieve the same effect. In different embodiments, the temperature employed in the sintering step is 750° C., 800° C., 850° C., 900° C., 950° C., 1000° C., 1050° C., 1100° C., 1150° C., 1200° C., 1250° C., 1300° C., 1350° C., 1400° C., 1450° C., 1500° C., 1550° C., or 1600° C., or within a temperature range bounded by any two of the foregoing exemplary values. For any of these temperatures, or a range therein, the processing time can be, for example, any of the exemplary processing times or time ranges provided above for the pyrolysis step.

Generally, the one or more heat treatment steps are conducted under normal atmospheric pressure. However, in some embodiments, an elevated pressure (e.g., above 1 atm and up to 2, 5, 10 or 110 atm) is employed, while in other embodiments, a reduced pressure (e.g., below 1, 0.5, or 0.2 atm) is employed. Furthermore, although the heat treatment steps are generally conducted under a normal air atmosphere, in some embodiments, an elevated oxygen, reduced oxygen, or inert atmosphere is used. Some gases that can be included in the processing atmosphere include, for example, oxygen, nitrogen, helium, argon, carbon dioxide, and mixtures thereof.

Although in many embodiments the heat treatment step is conducted for an entire length of time at a particular temperature, it may be preferred to gradually increase and/or decrease the temperature during the heat treatment step between any of the temperatures given above, or between room temperature (e.g., 15, 20, 25, 30, or 35° C.) and any of the temperatures given above. In different embodiments, the gradual increase or decrease in temperature can be practiced by employing a rate of temperature change of, or at least, or no more than 1° C./min, 2° C./min, 3° C./min, 5° C./min, 7° C./min, 10° C./min, 12° C./min, 15° C./min, 20° C./min, 30° C./min, 40° C./min, or 50° C./min, or any suitable range between any of these values. The gradual temperature increase can also include one or more periods of residency at a particular temperature, and/or a change in the rate of temperature increase or decrease.

The precursor solution being hydrolyzed and optionally heat-treated contains all of the metals to be included in the solid oxide material. The metals in the precursor solution are included in molar ratios (i.e., stoichiometric ratios) appropriate for producing a solid oxide material of a desired formula. Generally, it has been found herein that a solid oxide material of a desired formula can be produced from a precursor solution containing each of the metal species in molar ratios substantially corresponding (e.g., generally, within ±10%) to the molar ratios of elements in the oxide material to be produced. However, in several embodiments of the instant method, it has been found beneficial to employ a molar amount of lithium that exceeds the stoichiometric amount (i.e. as indicated by the formula of the oxide material to be produced) in order for a solid oxide material with the correct stoichiometric ratio of elements to be produced. In different embodiments, the molar excess of lithium can be, for example, at least a 50%, 100%, 150%, or 200% excess.

In a first set of embodiments, the precursor solution includes lithium ions and at least one type of pentavalent metal ion. The pentavalent metal ion can be, for example, pentavalent niobium ($Nb^{+5}$), tantalum ($Ta^{+5}$), or antimony ($Sb^{+5}$). In some embodiments, only one type of pentavalent metal ion is included (such as any one of the foregoing types), while in other embodiments, two, three, or more different pentavalent metal ions are included. The solution can also optionally further include, for example, one or more alkali metal ions other than lithium, and/or one or more alkaline earth metal ions, and/or one or more transition metal ions other than Nb or Ta, and/or one or more main group metal ions other than Sb, and/or one or more rare earth (i.e., lanthanide or actinide) metal ions.

In a second set of embodiments, the precursor solution includes lithium ions and at least one type of trivalent lanthanide metal ion. The lanthanide metal can be any of the elements in the Periodic Table of the Elements having an atomic number of 57 to 71, as described in further detail above. In particular embodiments, at least one of the lanthanide metals is La. The solution can also optionally further include, for example, one or more alkali metal ions other than lithium, and/or one or more alkaline earth metal ions, and/or one or more transition metal ions, and/or one or more main group metal ions.

In a third set of embodiments, the precursor solution includes lithium ions, at least one pentavalent metal ion, and, in addition, at least one type of trivalent lanthanide metal ion. The solution can also optionally further include, for example, one or more alkali metal ions other than lithium, and/or one or more alkaline earth metal ions, and/or one or more transition metal ions other than Nb or Ta, and/or one or more main group metal ions other than Sb.

The metals included in the precursor solution are associated or bound to negatively charged ligands. The ligand can be monodentate or polydentate (e.g., bidentate, tridentate, or tetradentate). In order for the precursor solution to undergo hydrolysis, at least a portion of the ligands are alkoxide ligands. In some embodiments, the ligands are entirely alkoxide ligands. The alkoxide ligands primarily considered herein are those having the formula —OR, where R is a hydrocarbon group, generally of 1 to 6 carbon atoms, and the hydrocarbon group can be, for example, saturated or unsaturated, straight-chained or branched, and cyclic or acyclic. Some typical examples of R include methyl, ethyl, n-propyl, isopropyl, n-butyl, isobutyl, sec-butyl, t-butyl, 2-methoxyethyl ($CH_3OCH_2CH_2$), trifluoromethyl, vinyl, allyl, cyclopentyl, cyclohexyl, phenyl, tolyl, and benzyl. The alkoxide ligand can also have more than one alkoxy portion, e.g., a di- or tri-alkoxide.

In particular embodiments, in addition to alkoxide ligands, at least a portion of the ligands are β-diketone ligands. A common β-diketone ligand useful herein is acetylacetone (i.e., 2,4-pentanedione, or "acac"). Other examples of β-diketone ligands include 2,4-hexanedione and 3,5-heptanedione.

In particular embodiments, in addition to alkoxide ligands, at least a portion of the ligands are carboxylate ligands. Some examples of carboxylate ligands include those having up to six, seven, or eight carbon atoms, e.g., acetate, propionate, butyrate, valerate, benzoate, malonate, fumarate, and succinate. In further embodiments, alkoxide ligands are used in combination with at least one β-diketone ligand and at least one carboxylate ligand.

In some embodiments, the precursor solution is hydrolyzed and heat treated in bulk form, i.e., in a container (e.g., tube, flask, or crucible). Generally, such a methodology will produce a solid mass that can be turned into a powder by further processing, such as by trituration, or by partial dissolution or loosening with a non-aqueous solvent, optionally aided by, for example, sonication, grinding, ball milling, and/or stirring.

In other embodiments, the precursor solution is deposited as a film onto a substrate before hydrolysis and heat treatment. The film of precursor solution can be of any desired thickness, as described above. In particular embodiments, the film of precursor solution is a thin film, as described above. The film of precursor solution can be applied by any suitable method known in the art, including, for example, by dip coating, brush coating, spin coating, and spraying. The substrate can be any substrate that can benefit by deposition thereon of a lithium-conducting solid oxide material. Particularly considered herein are those substrates that can be utilized as a component in a lithium-ion battery, particularly an electrode (i.e., cathode and/or anode) of a lithium-ion battery. Some examples of substrates include lithium, lithium alloys, carbon, graphite-lithium intercalation materials, lithium-containing oxide materials (e.g., $LiCoO_2$ and $Li_2Mn_2O_4$), lithium-conducting polymer electrolyte materials (e.g., polyacrylonitrile, polyvinylidene fluoride, or polyethylene oxide), silica, silicates, and metals, such as aluminum, tin, or any of the transition metals enumerated above, as well as alloys or oxides of these metals.

The metals, ligands, and any other solutes of the precursor solution are held (i.e., dissolved) in a non-aqueous solvent. The solvent can be, for example, an organic polar protic or non-protic solvent. Some examples of organic polar protic solvents include alcohols, e.g., methanol, ethanol, n-propanol, isopropanol, n-butanol, isobutanol, ethylene glycol, and the like. Some examples of organic polar non-protic solvents include acetonitrile, dimethylformamide, dimethylsulfoxide, methylene chloride, organoethers (e.g., tetrahydrofuran, dimethoxyethane, and diethylether), and the like. In some embodiments, a lower boiling point solvent is preferred (e.g., a boiling point up to or less than 25, 30, 35, 40, 45, 50, 55, or 60° C.), while in other embodiments a higher boiling point solvent is preferred (e.g., a boiling point of at least or greater than 65, 70, 75, 80, 85, 90, 95, 100, or 110° C.). In other embodiments, the solvent has a boiling point within a range bounded by any two of the foregoing exemplary boiling point temperatures.

A class of lithium ion precursor compounds useful as a source of lithium in the precursor solution include those of the formula LiX, wherein X is preferably an anion selected from alkoxide (OR, as defined above), β-diketonate, or carboxylate. The lithium precursor compound can also be heterometallic, such as $LiM(OR)_6$, $LiM(OR)_{6-n}(acac)_n$, and $LiLn(OR)_4$, wherein M is a pentavalent metal ion (e.g., pentavalent Nb, Ta, or Sb), Ln is a lanthanide metal (for example, La or Ce), and n is a value of 0, 1, 2, 3, 4, 5, or 6, or within a range therein. Some classes of pentavalent metal ion precursor compounds useful as a source of pentavalent metal in the precursor solution include those of the formula $M(OR)_5$, and $LiM(OR)_{6-n}(acac)_n$, described above. Some classes of lanthanide metal ion precursor compounds useful as a source of lanthanide metal in the precursor solution include those of the formula $Ln(OR)_3$, $Ln(OR)_{3-n}(acac)_n$, and $LiLn(OR)_4$, wherein Ln is a lanthanide metal and n is a value of 0, 1, 2, or 3, or within a range therein. If an alkaline earth metal is desired to be included, an alkaline earth precursor compound of, for example, formula $A(OR)_2$, $A(OR)(acac)$, or $A(acac)_2$ can be included, wherein A is an alkaline earth metal, as described in further detail above.

In some embodiments, it is particularly advantageous to incorporate into the precursor solution a heterometallic alkoxide composition (i.e., compound or material) that includes at least one pentavalent metal, at least one trivalent lanthanide metal, and negatively charged ligands, at least one of which is an alkoxide ligand. The ligands are associated, and more typically, bound, to the metal ions, thereby forming a metal-ligand complex. Since heterometallic alkoxides generally hydrolyze without dissociation, the M-OR-M' bond is replaced by M-OH-M' bonds in heterometallic alkoxides during hydrolysis. The M-OH-M' bonds are converted to M-O-M' bonds after hydrolysis. In comparison, a mixture of alkoxides form a mixture of hydroxides (e.g., M-OH-M, M-OH-M', and M'-OH-M') which form corresponding metal-oxide-metal bonds by a diffusion-controlled process during pyrolysis and sintering. Accordingly, at least one advantage in using a heterometallic alkoxide composition is that a metal oxide composition with desired metal-oxide-metal bonds can be produced with minimal amounts of unwanted metal-oxide-metal bonds.

In a particular embodiment, the heterometallic alkoxide composition has the following formula:

$$LnM_2X_{13} \quad (3)$$

In formula (3) above, Ln represents at least one trivalent lanthanide metal, M represents at least one pentavalent metal, and X is independently selected from negatively charged ligands, at least one of which represents an alkoxide ligand. In particular embodiments, M represents pentavalent niobium, tantalum, or antimony, or a combination thereof. In other or further embodiments, Ln represents La or Ce, or any of these lanthanide metals in combination with another lanthanide metal or doped with another metal.

Some more specific examples of compositions according to formula (3) include $LaNb_2(OR)_{13}$, $LaTa_2(OR)_{13}$, $LaSb_2(OR)_{13}$, $CeNb_2(OR)_{13}$, $CeTa_2(OR)_{13}$, $CeSb_2(OR)_{13}$, $NdNb_2(OR)_{13}$, $NdTa_2(OR)_{13}$, $NdSb_2(OR)_{13}$, $SmNb_2(OR)_{13}$, $SmTa_2(OR)_{13}$, $SmSb_2(OR)_{13}$, $EuNb_2(OR)_{13}$, $EuTa_2(OR)_{13}$, $EuSb_2(OR)_{13}$, $GdNb_2(OR)_{13}$, $GdTa_2(OR)_{13}$, $GdSb_2(OR)_{13}$, $DyNb_2$ $(OR)_{13}$, $DyTa_2(OR)_{13}$, $DySb_2(OR)_{13}$, $YbNb_2(OR)_{13}$, $YbTa_2(OR)_{13}$, and $YbSb_2(OR)_{13}$, wherein R has been defined above. In further embodiments, one or more of the OR ligands can be substituted by one or more β-diketonate or carboxylate ligands.

In other embodiments, it is particularly advantageous to incorporate into the precursor solution a heterometallic alkoxide composition that includes at least one pentavalent metal, at least one alkaline earth metal, and negatively charged ligands, at least one of which is an alkoxide ligand. In a particular embodiment, the heterometallic alkoxide composition has the following formula:

$$AX'_2MX_5 \qquad (4)$$

In formula (4) above, A represents at least one alkaline earth metal, M represents at least one pentavalent metal, and X and X' are independently selected from negatively charged ligands, provided that at least one of X represents an alkoxide ligand. In particular embodiments, M represents pentavalent niobium, tantalum, or antimony, or a combination thereof. In other embodiments, A represents Ca, Sr, or Ba, or a combination thereof.

Some more specific examples of compositions according to formula (4) include $Mg(OR)_2Nb(OR)_5$, $Ca(OR)_2Nb(OR)_5$, $Sr(OR)_2Nb(OR)_5$, $Ba(OR)_2Nb(OR)_5$, $Mg(OR)_2Ta(OR)_5$, $Ca(OR)_2Ta(OR)_5$, $Sr(OR)_2Ta(OR)_5$, $Ba(OR)_2Ta(OR)_5$, $Mg(OR)_2Sb(OR)_5$, $Ca(OR)_2Sb(OR)_5$, $Sr(OR)_2Sb(OR)_5$, $Ba(OR)_2Sb(OR)_5$, $Mg(acac)_2Nb(OR)_5$, $Ca(acac)_2Nb(OR)_5$, $Sr(acac)_2Nb(OR)_5$, $Ba(acac)_2Nb(OR)_5$, $Mg(acac)_2Ta(OR)_5$, $Ca(acac)_2Ta(OR)_5$, $Sr(acac)_2Ta(OR)_5$, $Ba(acac)_2Ta(OR)_5$, $Mg(acac)_2Sb(OR)_5$, $Ca(acac)_2Sb(OR)_5$, $Sr(acac)_2Sb(OR)_5$, and $Ba(acac)_2Sb(OR)_5$.

In one embodiment, the precursor solution is provided as a single solution containing all components necessary for synthesizing a desired solid oxide material. In other embodiments, two or more solutions are provided to prepare the precursor solution containing all components necessary for synthesizing a desired solid oxide material. To prepare the precursor solution, the two or more solutions, or portions thereof, are combined. Each of the solutions to be combined contains some, and not all, of the components necessary for synthesizing a desired solid oxide material. In some embodiments, the two or more solutions to be combined are conveniently provided as a package, such as in the form of a kit. The kit can optionally include instructions specifying the amounts and manner of use of the solutions, as encompassed by the above-described methodology. In yet other embodiments, the precursor solution is prepared from a concentrate, i.e., by appropriate dilution of the concentrate.

In another aspect, the invention is directed to a lithium ion battery that contains any of the lithium-containing solid oxide compositions described above. The lithium ion battery can have any of the architectures and designs of lithium ion batteries known in the art. Some types of lithium ion batteries particularly considered include the conventional lithium ion battery (i.e., that use as an electrolyte a lithium salt in an organic solvent), lithium ion polymer battery, and lithium air battery. As known in the art, some common features of lithium ion batteries include a negative electrode (often referred to as the anode), positive electrode (often referred to as a cathode), and a lithium-conducting electrolyte (typically, an organic solvent, such as an ether or organic carbonate) that transports lithium ions between the two electrodes during charging and discharging.

Numerous materials may be used as the positive or negative electrode. The choice of electrode material depends to a large extent on the construction of the lithium ion battery (e.g., compatibility of the electrode material with other components of the battery), desired performance characteristics (e.g., energy and power densities), and application. Some examples of anode materials include graphite (i.e., intercalated lithium graphite), lithium metal, lithium alloy (e.g., lithium-aluminum or lithium-indium), lithium-containing polyatomic anion transition metal compounds (e.g., $LiTi_2(PO_4)_3$), and lithium-containing transition metal oxides, particularly of titanium or vanadium, such as $Li_4Ti_5O_{12}$. Some examples of cathode materials include layered oxide materials (e.g., lithium-containing transition metal oxides, such as $LiCoO_2$, $LiNiO_2$, $LiMnO_2$, and $LiNi_xMn_yCo_zO_2$, wherein x, y, and z sum to 1, and at least one, two, or all of x, y, and z are non-zero), lithium-containing polyatomic anion transition metal compounds (e.g., $LiFePO_4$ and $Li_2FePO_4F$), and lithium-containing spinel oxides (e.g., $Li_2Mn_2O_4$). Typically, the electrode materials are configured as a layer on a base metal, such as aluminum, carbon, or stainless steel. If desired or found necessary, the electrode materials can also include an electron conduction additive, ion conduction additive, or both. Some examples of electron conduction additives include conductive carbon, metal powder, and conductive polymers. Some examples of ion conduction additives include lithium ion conductive crystals or glass-ceramics. In particular embodiments, an electron conduction and/or ion conduction additive is excluded. In other embodiments, one or both of the electrode materials are doped with a conductivity enhancement material, such as niobium, aluminum, or zirconium. The solid oxide electrolyte may also be doped.

In particular embodiments of the invention, a film of the solid oxide material described above is situated between the two electrodes and in contact with the two electrodes. Such a composite structure can be assembled by any of the methods known in the art. For example, a sheet of the solid oxide material can be placed between the two electrode materials, followed by heat pressing (e.g., by heating and roll pressing). The resulting laminate material can be appropriately cut to size and sealed. Lead lines and other device components can be installed during the sealing process, or sometime thereafter. Alternatively, a film (i.e., coating) of a precursor solution of the solid oxide material can be placed on either or both (e.g., between) the electrode materials, and this followed by hydrolysis and heat treatment operations for conversion of the precursor to the solid oxide material. In further embodiments, one, two, or more layers of another material can be situated between the electrode material and the solid oxide. The additional layer can serve any suitable function, such as to prevent contact of the electrode material with the oxide material if these materials are incompatible, or to adjust, improve, or optimize a characteristic, such as electron or ion conduction.

Generally, the solid oxide material described herein is employed as an electrolyte in place of (i.e., in the absence of) a liquid or polymer electrolyte. However, some embodiments may employ the solid oxide material described herein in tandem with either a liquid or polymer electrolyte material. The liquid or polymer electrolyte material may further include one or more lithium salts. Some examples of lithium salts include $LiBF_4$, $LiPF_6$, $LiAsF_6$, $Li_2SO_4$, and $LiCF_3SO_3$ (lithium triflate). If permitted by the composition of the electrodes and other components of the battery, a liquid or polymer electrolyte can include an amount of water.

Examples have been set forth below for the purpose of illustration and to describe certain specific embodiments of the invention. However, the scope of this invention is not to be in any way limited by the examples set forth herein.

EXAMPLE 1

Solution Synthesis of $La_3Li_5Nb_2O_{12}$ and Analysis Thereof

A mixture of $Nb(OC_2H_5)_5$ (0.76 g), $La(O-i-C_3H_7)_3$ (1.14 g), and $LiO-i-C_3H_7$ (0.39 g) in 2-propanol (40 mL) was stirred to obtain a homogenous clear solution. Without being bound by any theory, it is believed that this solution is a mixture of $LiNb(OC_2H_5)_6$, $3La(O-i-C_3H_7)_3$ and $LiO-i-C_3H_7$ in approximately a 2:3:3 ratio. In some cases, the clear solution was cooled (e.g., down to −78° C.), while in other cases, the clear solution was kept at room temperature. The stirring was continued until formed solids made stifling difficult or impossible. Upon careful hydrolysis with 0.72 g of water, a white gel was obtained, which, upon drying under vacuum or slow evaporation, furnished a xerogel. X-ray powder diffraction (XRD) analysis showed the xerogel to be amorphous. The pyrolysis of this powder at 600° C. for 4 hours resulted in a crystalline powder, which was identified to be primarily $LiLa_2NbO_6$ materials. These results suggest that there are amorphous $La_2O_3$ and $Li_2O$ (or LiOH) components in the powder. Sintering of the powder at 800° C. for 4 hours resulted in the crystallization of $La_3Li_5Nb_2O_{12}$ while residual $LiLa_2NbO_6$ was still present. Further sintering at 800° C. for 24 hours did not result in any change in the XRD pattern.

The foregoing results suggest loss of $Li_2O$ (or LiOH) during processing. Accordingly, in an effort to achieve a pure sample of $La_3Li_5Nb_2O_{12}$, the above preparation was repeated, this time using a 100% excess of lithium (i.e., a total of 0.78 g $LiO-i-C_3H_7$). The resulting xerogel, upon thermal treatment at 800° C. for 4 hours furnished a pure sample of $La_3Li_5Nb_2O_{12}$. The foregoing results demonstrate that a pure sample of $La_3Li_5Nb_2O_{12}$ was achieved by employing an excess of lithium.

EXAMPLE 2

Alternate Solution Synthesis of $La_3Li_5Nb_2O_{12}$ and Analysis Thereof

The reactants $Nb(OC_2H_5)_5$ (0.76 g), $La(O-i-C_3H_7)_3$ (1.14 g), and $LiO-i-C_3H_7$ (0.78 g) in 2:3:10 molar ratio were mixed in tetrahydrofuran (THF) and hydrolyzed with water. The resulting gel was dried and pyrolyzed, as described in Example 1, to obtain pure $La_3Li_5Nb_2O_{12}$. The excess Li(OR) in the reaction mixture was found to be necessary to counterbalance the loss of $Li_2O$ during pyrolysis. The sole FIGURE shows the XRD pattern of the product. Employing the Scherrer equation, the particle size has been calculated from the XRD pattern to be 28 nm.

While there have been shown and described what are at present considered the preferred embodiments of the invention, those skilled in the art may make various changes and modifications which remain within the scope of the invention defined by the appended claims.

What is claimed is:

1. A heterometallic alkoxide composition having the following formula:

$$LnM_2X_{13} \qquad (3)$$

wherein Ln represents at least one trivalent lanthanide metal, M represents at least one pentavalent metal, and X is independently selected from negatively charged ligands, at least one of which represents an alkoxide ligand.

2. The heterometallic alkoxide composition of claim 1, wherein said at least one pentavalent metal is selected from niobium, tantalum, and antimony.

3. The heterometallic alkoxide composition of claim 1, wherein said at least one trivalent lanthanide metal comprises lanthanum.

4. A heterometallic alkoxide composition having the following formula:

$$AX'_2MX_5 \qquad (4)$$

wherein A represents at least one alkaline earth metal, M represents at least one pentavalent metal, and X and X' are independently selected from negatively charged ligands, provided that at least one of X represents an alkoxide group.

* * * * *